Aug. 7, 1962 R. L. MANSFIELD 3,048,382
FIRE TUBE FURNACE AND METHOD FOR BAKING ARTICLES
Filed April 17, 1958 2 Sheets-Sheet 1
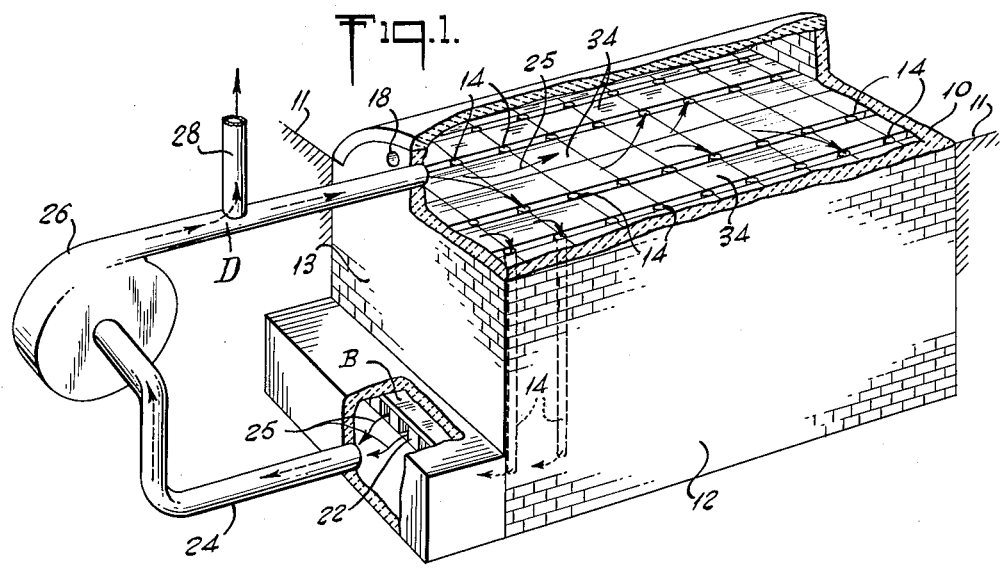
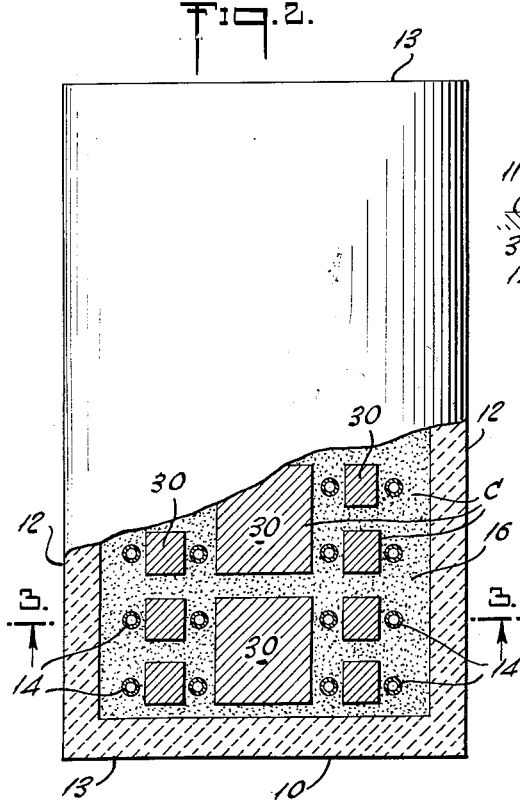
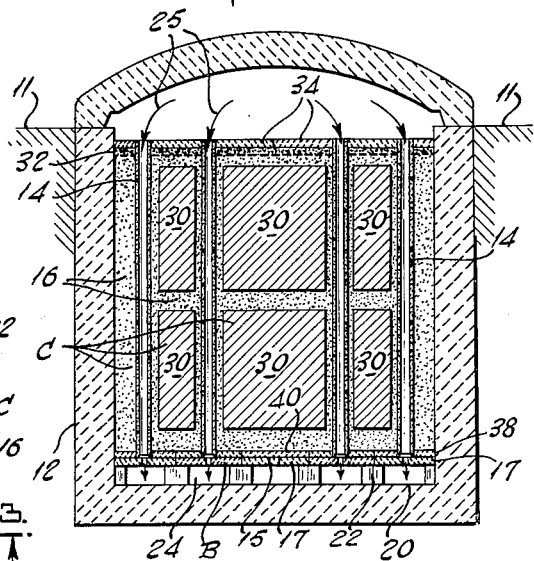
INVENTOR
RICHARD L. MANSFIELD
BY
ATTORNEY Aug. 7, 1962 R. L. MANSFIELD 3,048,382
FIRE TUBE FURNACE AND METHOD FOR BAKING ARTICLES
Filed April 17, 1958 2 Sheets-Sheet 2
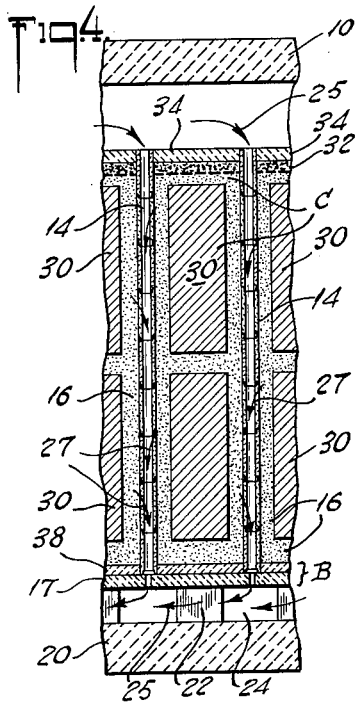
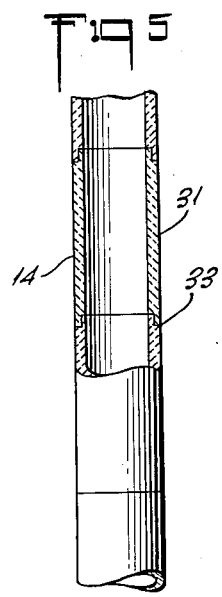
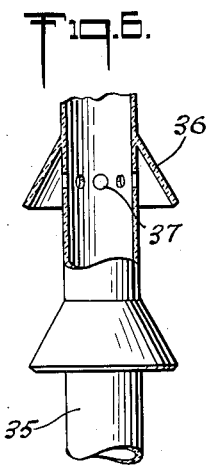
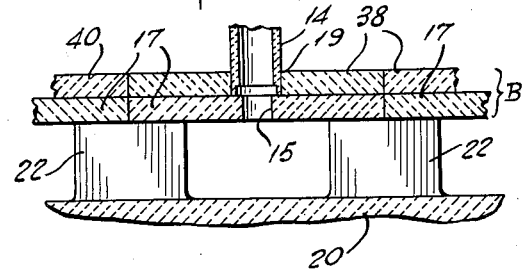
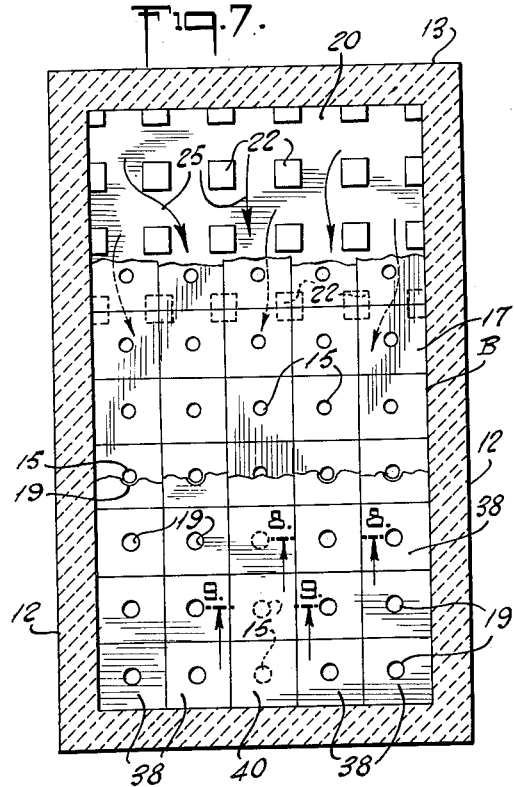
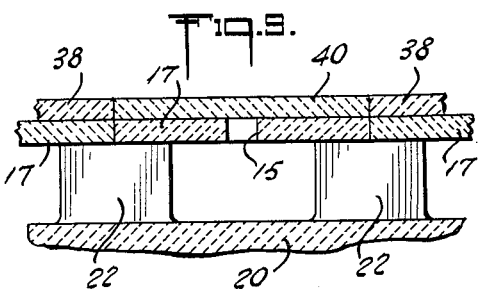
INVENTOR
RICHARD L. MANSFIELD
BY
ATTORNEY

United States Patent Office 3,048,382
Patented Aug. 7, 1962

3,048,382
FIRE TUBE FURNACE AND METHOD FOR BAKING ARTICLES
Richard L. Mansfield, Youngstown, N.Y., assignor to Union Carbide Corporation, a corporation of New York
Filed Apr. 17, 1958, Ser. No. 728,953
11 Claims. (Cl. 263—41)

This invention relates to improvements in the art of baking carbon articles in fluid fuel fired furnaces and it relates more particularly to a new and improved furnace construction for baking bulk packed carbon articles.

Gas and oil fired furnaces for baking carbon articles have long been known to the baking art, but up until the present invention very little improvement in the heat transfer characteristics of conventional furnaces has been made. Carbon articles, which are subject to oxidation at baking temperatures, must be blanketed with a protective covering, usually granular coke, prior to exposure to the normally oxidizing furnace atmosphere. Generally, the conventional furnace, which consists of a floor, top, end walls and side walls containing flue openings therein, is built in a pit and is so constructed that only the crowned removable top thereof shows above the ground. The cover is removed during loading of the furnace at which time the carbon articles and their covering are stacked therein from the floor, or bottom, to the side wall flue openings. Usually there is some considerable space left between the top of the charge and the cover of the furnace. This space is made necessary by the efflux of volatile components which are driven out of the carbon articles during baking and by the limitation the flue openings place on the height of the charge. The fuel and air combustion mixture is also passed over the charge and ignited in this space below the cover. The hot burning gases then pass down through side wall flues to channels under the bottom and out of the furnace area. Each individual flue usually has a separate channel under the bottom, and it sometimes happens that some of these channels become obstructed, thus eliminating the flues feeding such channels from the operation.

This construction gives good heat transfer to the top of the charge, but has the disadvantage of rendering only fair heat transfer to the sides and bottom of the charge. In this furnace, the heat transfer to the center of the charge is very poor. Another disadvantage is the necessity of thick side wall construction for incorporation therein of flues. Further, should a flue channel become obstructed, no alternate path for hot baking gases is provided.

It is therefore an important object of this invention to provide a furnace construction which affords increased heat transfer to all parts of the furnace charge.

It is another object of this invention to provide a furnace construction which affords a reduced heating-cooling cycle time of baking.

It is a further object of this invention to provide a furnace construction which is flexible and adapted to the baking of various size and shape articles in the same charge.

In the accompanying drawing:

FIG. 1 is an isometric view of a furnace incorporating this invention.

FIG. 2 is a plan view of a loaded furnace, part being in section, incorporating this invention.

FIG. 3 is a vertical section of a loaded furnace incorporating this invention taken along the line 3—3 of FIG. 2 looking in the direction of the arrows.

FIG. 4 is a vertical section of a portion of a furnace incorporating this invention taken transverse to the furnace length and showing the flow of volatile gaseous efflux.

FIG. 5 is an elevation, partially in section, of a jointed fire tube for use in this invention, part of the tube being broken away.

FIG. 6 is an elevation, partially in section, of a one-piece fire tube for use in this invention, part of the tube being broken away.

FIG. 7 is a plan view of the bottom of a furnace incorporating this invention, part of the bottom being broken away.

FIG. 8 is a section taken along line 8—8 in FIG. 7, looking in the direction of the arrows.

FIG. 9 is a section taken along the line 9—9 in FIG. 7 looking in the direction of the arrows.

This invention then comprises the incorporation of fire tubes in a fluid-fuel fired baking furnace, which tubes improve the heat transfer characteristics and capacity of the furnace.

This invention may best be described with reference to the baking of carbon articles in a gas fired furnace.

Referring to FIG. 1 of the drawings, a furnace shell 10, consisting of side walls 12, ends 13 and a floor 20 all of which are below ground level 11, is adapted to use in this invention by spacing piers 22, each of which is independent of all the others, on the floor 20 as best shown in FIG. 7. Intermediate floor plates 17, each having an aperture 15 therein, rest on the piers 22 with the apertures 15 coinciding with openings between the piers. Tiles 38, which each contain an aperture 19 therein, cover the intermediate floor plates 17 with the center lines of the apertures 19 and 15 coinciding. The aperture 19 in the tile 38 has a slightly larger diameter than the aperture 15 in the intermediate floor plate. As shown in FIGS. 7 and 9, it is not necessary that each intermediate floor plate 17 be covered with a tile 38 containing an aperture 19. In some positions, depending upon the nature and size of the articles to be baked, it is convenient to cover the intermediate floor plates 17 with upper floor plates 40 having no apertures therein. Thus a false bottom B is formed, including intermediate floor plates 17, each having an aperture 15 therein, some of which being covered by upper floor plates 40 having no apertures therein, and others being covered by tiles 38 having apertures 19 therein whose center lines coincide with the center lines of the apertures 15 in the intermediate floor plates, which rests on the piers 22 and supports the charge C to be baked.

The fire tubes 14 of this invention, as best shown in FIG. 5 are preferably constructed of ceramic cylinders 31, the ends of each interlocking by means of step joints 33 which provide lateral support for the column of cylinders. In the alternative, the fire tube 14 may consist, as shown in FIG. 6, of a one-piece metal tube 35, for example of stainless steel, which is suitably provided with small holes 37, for efflux of volatiles liberated during the baking, therethrough into the tube 35. Shields 36 around the holes 37 prevent the tubes from being filled with packing material during charging of the furnace.

Referring to FIG. 8, the fire tube 14 rests on the intermediate floor plate 17, around the aperture 15 therein, and is contained within the aperture 19 in the tile 38.

Referring again to FIGS. 1, 2 and 3, the fire tubes 14 extend upwardly from the false bottom B of the furnace through the baking chamber which contains the charge C made up of articles to be baked 30, a coke packing 16, a layer of sand 32 over the top layer of packing and articles, and blocks 34 over the sand. The gas-air fuel inlet port 18 is located above the upper surface of the charge C and the burning gas passes through this port 18, over the charge C, down through the fire tubes 14, under the false bottom B, between the piers 22, out of furnace through a header 24, and through a recirculating fan 26, part of the gas being recycled through a pipe D and part passing to the stack 28. The amount of burned gas passing out the stack 28 is equivalent to the amount of gas-air fuel introduced through the inlet port 18. The flow of gas is indicated by the arrows 25.

Referring to FIG. 4, the charge C rests on the false bottom B and is spaced between the fire tubes 14. The efflux of volatiles during baking is indicated by arrows 27 and the flow of fuel gas by arrows 25.

A furnace embodying this invention was constructed in a pit below ground level. The furnace shell, comprising walls, ends and a floor, was adapted to this invention by building a false bottom over the floor. The false bottom was supported by 9 inch cube piers spaced at 18 inch intervals on the floor. Atop these piers, 18 inch square by 3 inch thick intermediate floor plates were placed in such position that each plate was supported by four piers and each pier supported four plates, except along the furnace walls where half-piers partially supported only two plates. Each plate contained a 3 inch diameter hole in the center thereof and onto these plates were placed tiles of the same size, some of which contained 4 inch diameter holes in the center thereof.

A long wooden rod was inserted into the coincident holes and this was used as a shaft over which were strung successive unglazed ceramic cylinders having an inside diameter of about 3 inches or equal to the diameter of the hole in the intermediate floor plate, an outside diameter of about 4 inches or equal to the diameter of the hole in the tile, and a length of about 12 inches. Each cylinder had a one quarter inch step cut out of the outer diameter of one end and a similar step cut out of the inner diameter of the other end so as to allow interfitting of the cylinders with each other. Each fire tube was built by inserting a cylinder into the hole in a tile and joining successive cylinders by means of the above-mentioned steps.

The carbon articles to be baked were then placed around the fire tubes, suitably covered with conventional petroleum packing coke as a protection against oxidation, and the whole charge was built up in this manner to a point just below the crowned cover. Immediately above the top of the top layer of carbon articles a 3 inch to 8 inch layer of coke packing material, then a 2 inch to 4 inch layer of sand, and then a layer of loosely laid 2 inch to 3 inch thick ceramic blocks were placed to prevent oxidation of the carbon articles by the furnace gases above. After the arched brick cover was installed, the furnace was ready for firing. The combustible gas-air mixture was ignited and it passed over the charge and down through the respective fire tubes wherein it imparted its heat of combustion to the charge and was exhausted through the space between the false bottom and the floor between the piers.

Table 1, below, shows comparative statistics on a conventional furnace and the furnace of this invention. In both cases, natural gas of equivalent heat value was employed and the same kind and size of carbon articles comprised the furnace load.

|  | Wall flue furnace | Fire tube furnace |
| --- | --- | --- |
| Baking chamber depth_____feet___ | 9 | 12 |
| Baking chamber width_____do____ | 10 | 12 |
| Baking chamber length_____do____ | 20 | 20 |
| Weight of baked product_____lbs___ | 75,000 | 95,000 |
| Heating-cooling cycle_____days__ | 73 | 40 |
| Cooling period_____do____ | 14 | 5 |
| Fuel gas consumption_____cu. ft./lb. of product__ | 13½ | 8½ |

It is to be noted that the quantity of product baked in the fire tube furnace was 20,000 pounds greater than in the conventional furnace. The total heating-cooling cycle was reduced by 33 days or almost half of the conventional time. It is further to be noted that it took 5 cubic feet of fuel gas per pound of product less to bake the charge of the fire tube furnace than the flue type furnace.

Because it is not necessary to have a fire tube inserted at each and every aperture in the furnace of the invention, it is possible to bake charges of mixed size efficiently by simple rearrangement of the tubes. This way, the heat flow may be regulated to suit any particular charge. If a conventional furnace is available, it is practical to rebuild it so as to incorporate this invention. The wall flues and bottom channels are removed and a false bottom and fire tubes as described above are installed. The removal of the bulky side wall flues facilitates reducing the wall thickness thereby increasing the baking capacity of each furnace without increasing the overall size. Further, the heat transfer of a fire tube furnace is vastly superior to the side flue type in that the heat source is in closer proximity to the articles to be heated, and therefore, more heat is absorbed quicker and more uniformly by the charge in the fire tube furnace than in a conventional flue furnace. The heat transfer is further aided by the volatile products of baking passing through the fire tube walls and being burned along with the original fuel. In the flue type furnace, these volatiles had to pass up through the charge and could only be exhausted at the top of the charge where they burned and added to the already unbalanced heat distribution. It may be seen that this extremely unbalanced heat flow is more equalized by the efflux of these volatiles into the fire tubes and burning there or below the false bottom. This tends to even out the heat differential from top to bottom and gaves a more uniformly baked product.

The spacing of the fire tubes relative to the walls or other tubes may be varied to suit the peculiarities of any particular charge. It is not necessary for the practice of this invention that there be any particular number of tubes nor that they be of any particular dimensions, nor need their shape be circular. The tubes may be of any metal or ceramic material suitably resistant to the temperature and atmosphere of the furnace. Preferably, this invention employs ceramic cylinders in juxtaposition as a fire tube but it has been found that stainless steel works well and many other materials will suggest themselves to those skilled in the art. It is important, however, that means be provided to exhaust the volatile products of baking into the fire tubes either by porosity of the tube itself or any other available method. It is possible, and may sometimes be practical, to use a liquid or even a powdered, fluidized solid as fuel or to pass the fuel up through the tubes rather than down through them as has been herein above described. This furnace construction is not adapted alone to the baking of carbon articles but may be used to advantage in any substantially bulk baking operation.

What is claimed is:

1. In a furnace for baking carbon articles which comprises a single chamber having side walls, a top, end walls, a floor with the inside faces of the side walls and end walls defining the perimeter of said floor and means for introducing a combustible fuel-air mixture to said furnace, the combination of a false bottom, having at least one aperture therein, supported by piers mounted on the furnace floor, said aperture being unobstructed by said piers, and at least one fire tube disposed on said bottom communicating with an aperture therein and extending upwardly from said bottom and spaced from said wall to provide a path for hot products of combustion of said fuel-air mixture, said fire tube adapted to communicate with the volatile products of said baked carbon articles and being so constructed as to permit the diffusion therethrough of said volatile products, said fire tube defining zones in said single chamber for said articles to be baked.

2. A furnace as described in claim 1 wherein said fire tube is composed of a ceramic substance.

3. A furnace as described in claim 1 wherein said fire tube is composed of jointed porous sections, said joints comprising shoulders formed on each section, said joints providing lateral support for said tube.

4. A furnace as described in claim 1 wherein said fire tube is composed of a refractory metal having small holes therein for efflux of volatile products of baking therethrough.

5. A furnace as described in claim 4 wherein said metallic substance is stainless steel.

6. A furnace as described in claim 1 wherein said fire tube is of a substantially circular cross-section.

7. A furnace as described in claim 1 wherein said false bottom is composed of ceramic tile.

8. A furnace as described in claim 6 wherein said false bottom is composed of an upper layer and a lower layer of ceramic tile, said upper and lower layers having at least one coincidental aperture therein, said upper aperture being of a diameter equal to the outside diameter of said fire tube, said lower aperture being of a diameter equal to the inside diameter of said fire tube, said upper aperture forming a socket for receipt therein of said fire tube, said tube resting on said lower layer and around said lower aperture.

9. In a method of baking carbon articles in a fluid-hydrocarbon fired single chamber furnace which comprises charging said articles and protective covering to be baked into said furnace, passing hot, burning fuel over and around said articles and said covering and heating said articles to a baking temperature; the improvement consisting of building a false bottom over the bottom of said furnace, said false bottom having therein a multiplicity of apertures, erecting porous fire tubes which are in laterally spaced relation to provide zones for said charge in said single chamber, building up said charge in said zones around said fire tubes, and passing hot, burning fuel through said fire tubes as well as over and under said charge.

10. A method of installing fire tubes in a single chamber gas fired baking furnace adapted to bake a charge of carbon articles and protective covering, which furnace consists of ends, bottom and top, and side walls at least one of which containing a fuel-air inlet port; said method comprising building a false bottom supported by piers, over said bottom, said false bottom having apertures therein, inserting long rods, of a smaller diameter than said apertures, therethrough, passing interfitting ceramic tiles over said rods, said tiles fitting into said apertures and resting on said false bottom, building up said tiles to a height at least equal to the height of the charge of material to be baked, and removing said rods.

11. A method of baking articles in a fluid-hydrocarbon fired single chamber furnace; which method comprises building a false bottom above the floor of said furnace, said false bottom being supported by piers randomly spaced on said floor, said false bottom containing therein at least one randomly disposed aperture, stacking said articles to be baked on said false bottom, said stacked articles being so disposed as not to cover said aperture, building up a fire tube over said aperture to a height at least equal to the height of said stacked articles, passing burning fuel above said stacked articles and down through said fire tube to space between said piers, heating said articles with burning fuel to a baking temperature, cooling said articles, and removing said articles from said furnace.

References Cited in the file of this patent

UNITED STATES PATENTS

| | | |
|---|---|---|
| 90,847 | Johnson et al. | June 1, 1869 |
| 171,811 | Hunter | Jan. 4, 1876 |
| 984,287 | Morimura | Feb. 14, 1911 |
| 1,120,147 | Hughes | Dec. 8, 1914 |
| 1,170,313 | Nagelschmits | Feb. 1, 1916 |
| 2,189,624 | Bramble | Feb. 6, 1940 |
| 2,495,615 | Vander Clute | Jan. 24, 1950 |
| 2,499,704 | Utterback et al. | Mar. 7, 1950 |
| 2,537,670 | Horner et al. | Jan. 9, 1951 |
| 2,598,474 | Weaver | May 27, 1952 |